Feb. 2, 1943. A. H. MAYNARD 2,309,778
FASTENER-APPLYING IMPLEMENT
Filed April 2, 1941 2 Sheets-Sheet 1
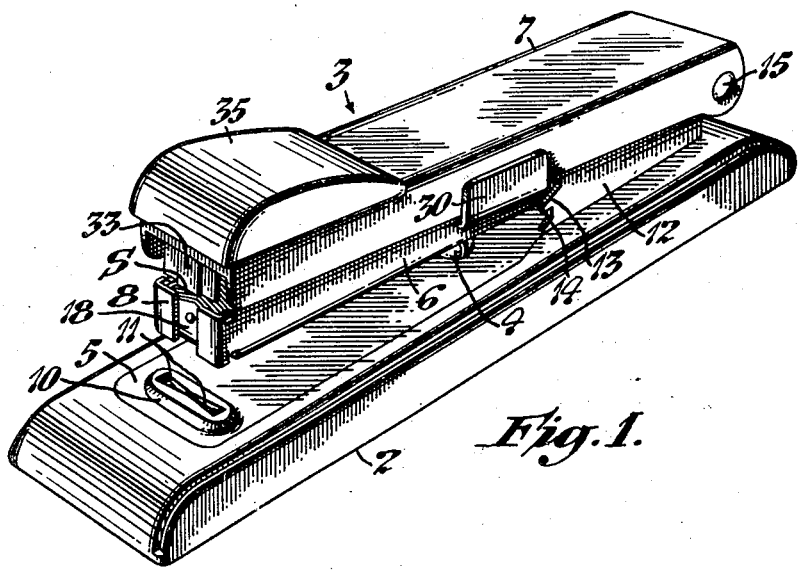
Fig. 1.
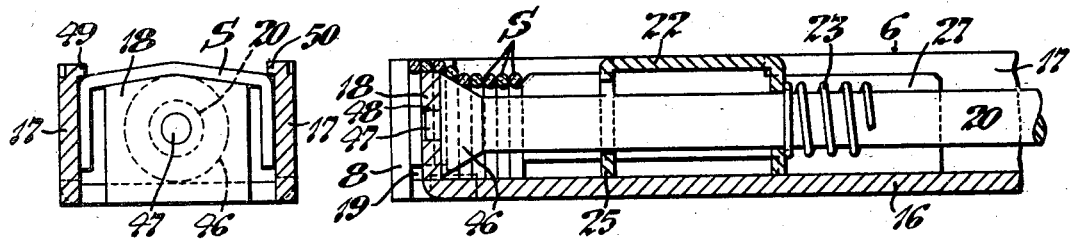
Fig. 7. Fig. 8.
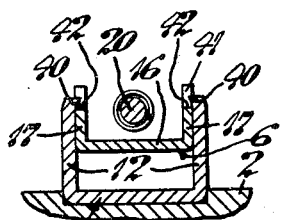 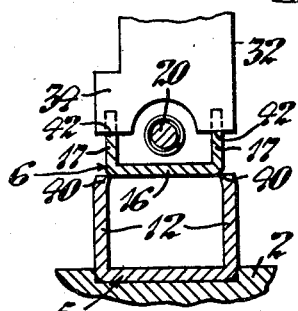 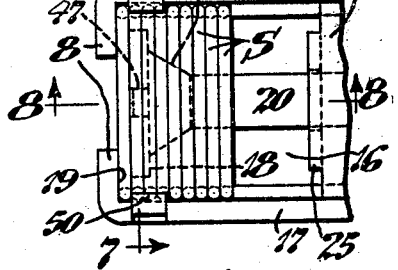
Fig. 9. Fig. 10. Fig. 6.
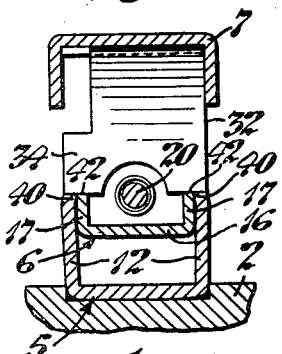
Fig. 11.
Inventor:
Arthur H. Maynard
By Harrington and White
Attorneys.

Feb. 2, 1943. A. H. MAYNARD 2,309,778
FASTENER-APPLYING IMPLEMENT
Filed April 2, 1941 2 Sheets-Sheet 2
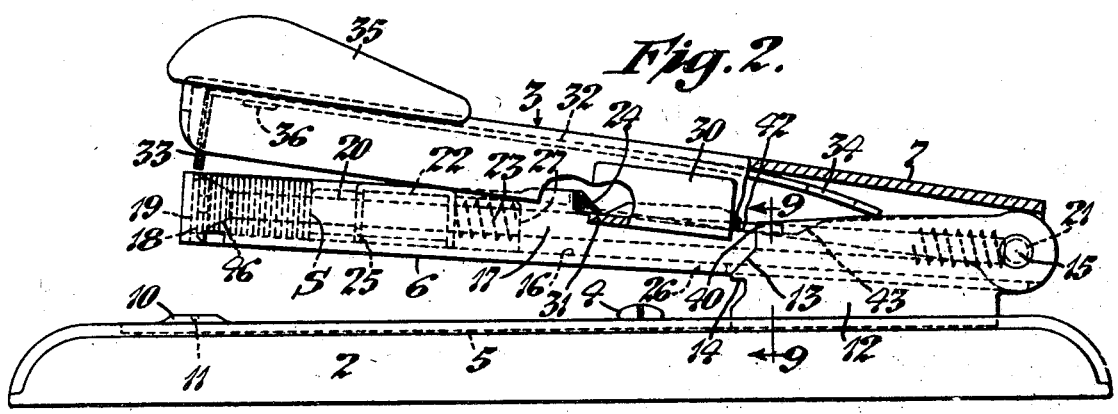
Fig. 2.
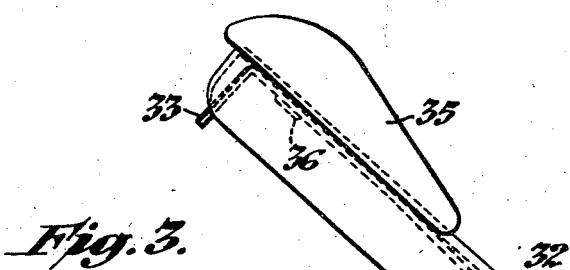
Fig. 3.
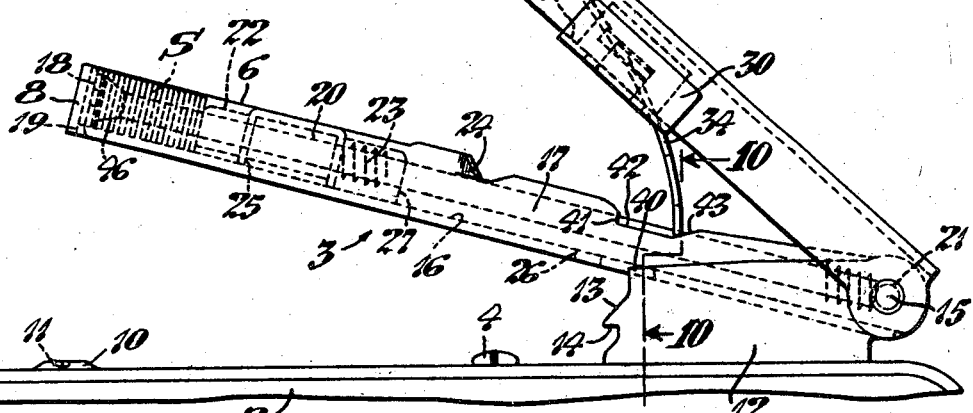
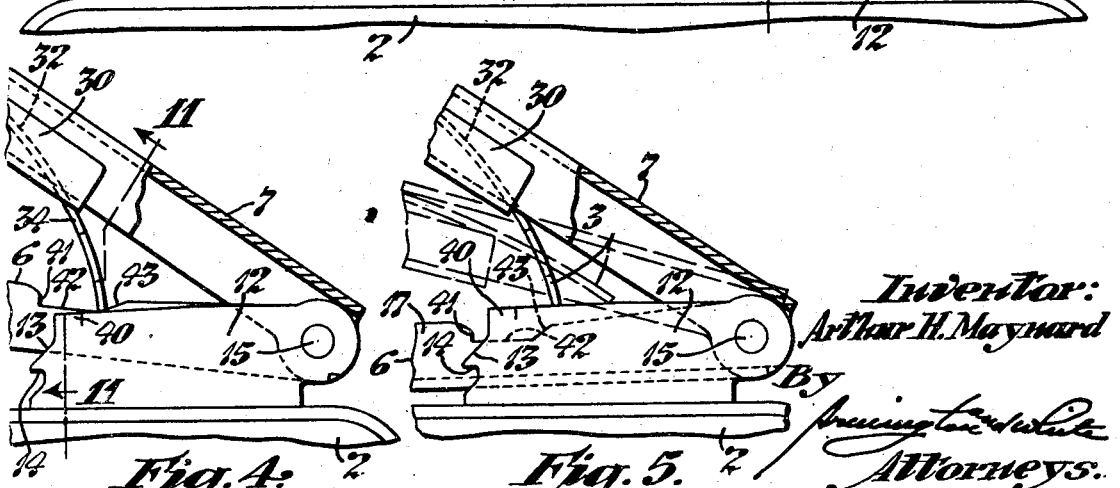
Fig. 4. Fig. 5.
Inventor:
Arthur H. Maynard
By
Attorneys.

Patented Feb. 2, 1943

2,309,778

UNITED STATES PATENT OFFICE 2,309,778

FASTENER-APPLYING IMPLEMENT

Arthur H. Maynard, Warwick, R. I., assignor to Boston Wire Stitcher Company, Warwick, R. I., a corporation of Maine Application April 2, 1941, Serial No. 386,488

7 Claims. (Cl. 1—3)

This application is a continuation in part of my copending application for United States Letters Patent, Serial No. 245,105, filed December 12, 1938, now Patent No. 2,264,322, issued December 2, 1941, and relating to fastener-applying implements. Such implements are adapted for use in attaching papers and other sheets, securing tags and labels to articles of commerce and for use generally for fastening and stitching together various objects and articles.

The fastener-applying implement illustrated and described in my prior application, referred to above, comprises a base, a magazine-arm and a fastener-applying lever with these elements pivotally connected for relative movement. With this previously used type of implement the magazine-arm is movable freely with respect to the base, rendering it awkward to handle the implement, for example, in picking it up. To load the implement with a supply of fasteners the fastener-applying lever is swung away from the magazine-arm to permit fasteners to be supplied through the open top of the arm. After a loading operation the fastener-applying lever is swung back into operative position above the magazine-arm. It sometimes happens, however, that the operator of the implement lifts the magazine-arm away from the base, either inadvertently or when loading the magazine-arm, and presses the fastener-applying lever toward the magazine-arm while the latter is held between the forefinger and thumb. Such unwarranted or careless handling of the implement results in causing a fastener to be driven into the thumb. The implement disclosed in my prior application has a more or less limited use in that it is only adapted for applying fasteners of a certain size which must be of accurate dimensions to adapt them to pass over the shear-plate at the rear of the throat.

One of the objects of the present invention is to provide a construction and arrangement of the parts of the implement to restrain movement of the magazine-arm away from the base whereby to render it easier to handle the implement and also prevent insertion of the thumb between the arm and base.

Another object of the invention is to provide an implement of the type indicated with detent-means operative between the fastener-applying lever and magazine-arm to prevent their movement toward each other to close the magazine-arm when the latter is lifted above its normal raised position with respect to the base.

Another object is to provide an implement of the type indicated in which the free end of the lifting spring is engaged by a latching shoulder on the magazine-arm when the latter is raised above the base and the end of the lifting spring released by engagement with the stanchions on the base when the magazine-arm is moved to a position adjacent the base.

Another object is to provide an implement of the type indicated with an inclined ramp at the rear of the shear-plate for guiding the fasteners from the magazine to the throat through which they are driven to adapt the implement for use with fasteners having legs of different lengths.

Further objects of the invention are set forth in the following specification which describes a preferred form of construction of the invention, by way of example, as illustrated by the accompanying drawings. In the drawings:

Fig. 1 is a perspective view of a fastener-applying implement incorporating the novel features of the present invention;

Fig. 2 is a side elevational view partly in section showing the lifting spring for holding the fastener-applying lever, magazine-arm and base in their operative relationship and the friction detents on the stanchions of the base for restraining the magazine-arm from abnormal movement away from the base;

Fig. 3 is a view similar to Fig. 2 showing the end of the lifting spring on the operating lever engaging the detent-shoulders on the magazine-arm to prevent relative movement of the lever and arm to close the latter when the magazine-arm is raised away from the base;

Fig. 4 is a view similar to Fig. 3 showing the magazine-arm as rocked toward the base by pressure applied to the fastener-applying lever and the end of the lifting spring engaging the top of the stanchions on the base;

Fig. 5 is a view similar to Fig. 4 showing the end of the lifting spring released from engagement with the detent-shoulders on the magazine-arm by its engagement with the stanchions on the base;

Fig. 6 is a plan view of the forward end of the magazine-arm showing the hold-down lugs overlying the staples adjacent the shear-plate;

Fig. 7 is a transverse sectional view taken on line 7—7 of Fig. 6 showing the conical end of the bracing strut which has its periphery in alinement with the upper edge of the shear-plate;

Fig. 8 is a longitudinal sectional view taken on line 8—8 of Fig. 6 showing the ramp formed by the conical end of the bracing strut for guiding the fasteners onto the upper edge of the shear-plate;

Fig. 9 is a transverse sectional view taken on line 9—9 of Fig. 2 showing the inward inclination of the detents on the stanchions of the base for frictionally holding the magazine-arm against abnormal movement away from the base;

Fig. 10 is a transverse sectional view taken on line 10—10 of Fig. 3 showing the end of the lifting spring in engagement with the detent-shoulders on the magazine-arm to force the latter between the friction detents on the stanchions of the base;

Fig. 11 is a transverse sectional view taken on line 11—11 of Fig. 4 showing the end of the lifting spring engaged with the stanchions on the base to release it from engagement with the detent-shoulders on the magazine-arm.

In the accompanying drawings the invention is illustrated as applied to a device for driving and clinching U-shaped staples, but it is to be understood that the implement may be used to apply other forms of fasteners. As previously stated, the implement illustrated and described herein is generally similar to that disclosed in my prior copending application, Serial No. 245,105, now Patent No. 2,264,322, issued December 2, 1941, referred to above. Suffice it to state herein that the implement comprises an auxiliary base 2 of generally rectangular form on which a fastener-applying device 3 is detachably mounted by means of snap-fastening means 4. The fastener-applying implement 3 comprises a base 5 which fits into a recess in the auxiliary base 2, a magazine-arm 6 and a fastener-applying lever 7. The base 5 of the fastener-applying device 3 supports an anvil 10 with clincher grooves 11 at one end and is provided with upright spaced stanchions 12 at its opposite end. The forward edge of one of the stanchions 12 has an inclined cam face 13 and a latching shoulder 14.

The magazine-arm 6 is of channel-shape having a bottom wall 16 and spaced side walls 17 to adapt U-shaped staples S to be supported therein by the direct engagement of the ends of their legs with the bottom wall of the arm and the sides of their legs with the side walls thereof. The rearward end of the magazine-arm 6 is positioned between the upright spaced stanchions 12 on the base 5 and hingedly mounted on a pivot-pin 15 extending transversely through the stanchions and the side walls 17 of the magazine-arm. The magazine-arm 6 is thus mounted for swinging movement toward and away from the base 5. At its forward end the magazine-arm 6 has its bottom wall 16 folded upwardly to provide a shear-plate 18, so-called, and the ends 9 of its side walls 17 are folded inwardly in spaced relation to the shear-plate to provide a throat 19 therebetween. A strut 20 has its rearward end seated in a recess 21 in the pivot-pin 15 and its forward end abutting the rearward face of the shear-plate 18 for bracing the latter against movement rearwardly.

The staples S are advanced longitudinally of the magazine-arm 6 by means of a pusher 22 slidably mounted on the strut 20 and urged forwardly by means of a coiled spring 23 encircling the strut. The pusher 22 is provided with a depending detent-lip 25 engageable with the edge of an opening 26 in the bottom wall of the magazine-arm 6, see Figs. 2 and 3, to latch it in retracted position; and the pusher has rearwardly extending arms 27 for tilting it to release it when the fastener-applying lever 7 is swung to close the magazine-arm as described in detail in my prior application. One of the side walls of the magazine-arm 6 is also provided with a laterally extending latching shoulder 24.

The fastener-applying lever 7 is of inverted channel-shape and of such width as to adapt its depending flanges to straddle the stanchions 12 on the base. The lever 7 is pivotally mounted on the ends of the pivot-pin 15 projecting laterally from the stanchions 12 and through the side flanges of the lever. Slidably mounted on one of the depending sides of the fastener-applying lever 7 is a latch-plate 30 having an inwardly extending latching shoulder 31 adapted to underlie the latching shoulder 24 which projects laterally from the magazine-arm 6. The construction and arrangement of the slidable latch 30 is such that upon rocking movement of the fastener-applying lever 7 from the raised position illustrated in Fig. 3 to the closed position illustrated in Fig. 1 the rearward end of the latch-plate engages the inclined cam-face 13 on the stanchion 12 of the base to slide it forwardly, whereby to cause its inwardly directed shoulder 31 to underlie the latching shoulder 24 on the magazine-arm.

A resilient element 32 in the form of a leaf spring is mounted on the underside of the fastener-applying lever 7 and has a right-angular end so formed as to provide a driver 33 for reciprocation in the throat 19 of the magazine-arm 6. The free length 34 of the resilient element 32 is generally curved as illustrated in Fig. 3 to adapt its rearward end to engage the upper edges of the side walls of the magazine-arm 6 and also the upper edges of the stanchions 12 on the base 5 to hold the magazine-arm in normal spaced relation to the base and the fastener-applying arm in normal spaced relation to the magazine-arm, see Fig. 2. A knob or finger-piece 35 is mounted on the forward end of the fastener-applying arm 7 and has a stud 36 projecting through the arm and the resilient element 32 with its end riveted to secure the parts in assembled relationship. As thus far described the implement is substantially identical with that illustrated and described in my prior copending application.

In accordance with the present invention, frictional detent-means 40 are provided on the stanchions 12 of the base 5 for engaging the magazine-arm 6 to restrain it against movement away from the base beyond its normal range of action whereby to guard against insertion of the operator's thumb or finger in under the throat 19. The detents 40 are in the form of angular tabs at the forward upper corners of the stanchions 12, see Figs. 2 to 5. The detent-tabs 40 are formed by bending the upper forward edges of the stanchions 12 inwardly in the manner indicated in Figs. 9 and 10. The side walls of the magazine-arm 6 are cut away to provide recesses 41 forming shoulders 42 below their upper edges for cooperation with the inwardly extending edges of the detent-tabs 40. As shown in Fig. 9, the inward edges of the detents 40 engage the shoulders 42 to limit the upward movement of the magazine-arm 6 and the arrangement of the detents and shoulders is such that when engaged the upper edges of the side walls 17 of the magazine-arm are in substantial alinement with the upper edges of the stanchions 12. The detent-tabs 40 are adapted to yield to permit the magazine-arm 6 and fastener-applying lever 7 to be swung away from the base 2 so that the implement may be used as a tacker, but such movement of the magazine-arm is frictionally resisted by the detent-tabs to prevent unintentional displacement of the magazine-arm with respect to the base.

If for any reason the magazine-arm 6 is swung away from the base 2 to the position illustrated in Fig. 3 and the fastener-applying lever 7 released by the latch 30 to open the magazine-arm, a second detent-means functions automatically to positively prevent relative movement of the fastener-applying lever and magazine-arm toward each other until the magazine-arm is lowered to operative position. To this end the rearward edges of the recesses 41 in the side walls 17 of the magazine-arm 6 are formed as inclined cam-faces 43 engageable by the free end of the resilient element 32, see Figs. 3 to 5. The curvature of the free end 34 of the resilient element 32 is such that it assumes an acute angle with respect to the cam-faces 43 on the side walls 17 of the magazine-arm 6 tending to prevent the end of the resilient element from sliding upwardly on the cam-faces when a force is applied on the fastener-applying arm to move it toward the magazine-arm. The resilient element 32 thus acts as a brace or strut between the fastener-applying lever 7 and the magazine-arm 6 to prevent relative movement thereof toward each other to close the magazine-arm when the latter is raised to a position above the friction detents 40 on the base 5.

To close the magazine-arm 6 when the parts are in the relative positions illustrated in Fig. 3 a downward force is applied manually on the knob 35. Such force is transmitted through the resilient element 32 to the edges of the recesses 41 in the side walls 17 of the magazine-arm 6 at a point forwardly of the pivot-pin 15 to cause the arm to be rocked toward the base 5, see Fig. 4. When the parts reach the position illustrated in Fig. 4, the free end 34 of the resilient element 32 will engage the upper edges of the stanchions 12 on the base 5. Due to the horizontal arrangement of the upper edges of stanchions 12 they act to direct the free end 34 of the resilient element 32 rearwardly to slide it along the inclined cam-faces 43 on the side walls 17 of the magazine-arm 6. The continued pressure of the resilient element 32 on the cam-faces 43 will force the magazine-arm 6 past the friction detents 40 whereby its forward end will contact against the base 5. During the last portion of the downward movement of the magazine-arm 6 the rearward sliding movement of the resilient element 32 along the upper edges of the stanchions 12 releases it from the cam-faces 43 as indicated in Fig. 5.

Another feature of improvement in the present invention resides in the provision of an inclined ramp at the rear of the shear-plate 18 for guiding the staples S upwardly across the upper edge thereof whereby to adapt the implement for use with staples having legs of different lengths. Although the ramp may be constructed in other forms, as herein illustrated it is in the form of a frusto-conical enlargement 46 at the forward end of the strut 20 having its forward end in abutting engagement with the rearward face of the shear-plate 18. As shown in Figs. 7 and 8, the forward end of the strut 20 has a centering stud 47 which projects into an aperture 48 in the shear-plate 18 and the base of the conical enlargement 46 abuts the rearward face of the shear-plate with its periphery tangential to the upper edge thereof. Due to its conical form the ramp or enlargement 46 provides a gradual incline from the strut 20 upwardly to the upper edge of the shear-plate 18 to guide the staples thereacross as they are advanced by the pusher 22 in the manner illustrated in Fig. 8.

It will be understood, however, that the staples S are usually attached to each other to provide a self-sustaining stick in which case the forward end of the stick is guided upwardly by the inclined ramp and the remainder of the stick will extend rearwardly in a straight line from the foremost staple back to the pusher. The foremost staples S in the magazine-arm 6 are restricted in their upward movement by means of hold-down lugs 49 and 50 which project inwardly from the side walls 17 of the arm and overlie the upper edge of the shear-plate 18, see Figs. 6 and 7. The forward edges of the hold-down lugs 49 and 50 also provide guides for the rearward face of the driver 33. One form of the invention having now been described in detail, the mode of operation of the implement is as next explained.

To load the implement with a supply of fasteners S the latch 30 is slid rearwardly to release its latching shoulder 31 from the latching shoulder 24 on the magazine-arm 6 and the fastener-applying lever 7 is swung upwardly from the magazine-arm to open the latter. The pusher 22 is then retracted manually and depressed to engage its depending lip 25 with the edge of the opening 26 in the bottom wall of the magazine-arm 6. The supply of staples S, usually in the form of a self-sustained stick, is then inserted into the magazine-arm 6 with the ends of the legs of the staples resting on the bottom wall 16. The staples S may be of any suitable size with their legs not greater in length than the height of the shear-plate 18, see Fig. 7. The fastener applying arm 7 is rocked back toward the magazine-arm 6 and due to the position of the arm adjacent the base 5 the free end 34 of the resilient element 32 will engage the upper edges of the stanchions 12 and be guided rearwardly thereon to the position illustrated in Fig. 2. During the rocking movement of the fastener-applying arm 7 toward the magazine-arm 6 the latch 30 is slid forwardly by the cam 13 on the base 5 to cause its shoulder 31 to underlie the shoulder 24 on the arm. Upon release of the fastener-applying lever 7 the end 34 of the resilient element 32 bearing against the upper edges of the stanchions 12 will raise the fastener-applying arm 7 to its normal position and due to the connection of the latter with the magazine-arm 6 by the latch 30, the arm will be raised to its normal position illustrated in Fig. 2. During the upward movement of the magazine-arm 6 the arms 27 projecting rearwardly from the pusher 22 are engaged by the free end 34 of the resilient element 32 to rock the pusher to release its depending lip 25 from the latching shoulder 26. The pusher 22 will then slide forwardly under the action of the spring 23 to advance the staples toward the throat 19. As the staples are advanced in the magazine-arm 6 the foremost staples will ride up the ramp formed by the conical enlargement 46 on the strut 20 to slide across the upper edge of the shear-plate 18. The end staple in the stick will thus be forced into the throat 19 abutting the inwardly-folded ends 8 of the side walls 17. The implement may then be operated in the usual manner by placing the work to be stapled on the base 5 and depressing the knob 35 to cause the driver 33 to reciprocate in the throat 19. The staple S or other fastener will thus be driven through the work and the ends of its legs clinched by engagement with the grooves 11 in the anvil 10.

The upward movement of the magazine-arm 6 is normally restrained by the engagement of the friction detents 40 on the base 5 with the shoulders 42 at the bottom of the recesses 41 in the sides of the arm. If the magazine-arm 6 is manually lifted to the position illustrated in Fig. 3 against the action of the friction detents 40 and the fastener-applying arm 7 released from the magazine-arm, the free end 34 of the resilient element thereafter will act against the cam-faces 43 at the rear of the recesses 41 to prevent relative movement of the parts to close the magazine-arm. With this arrangement of the parts a force applied on the knob 35 of the fastener-applying arm 7 will cause the magazine-arm to be moved to its normal position with respect to the base 5 as the end 34 of the resilient element 32 rides along the upper edges of the stanchions 12. The parts of the implement are thus returned to operative relationship before a staple can be driven, this provision guarding against injury to the operator's hand by driving a staple into the thumb or finger held under the arm 6.

It will be observed from the foregoing specification that the present invention provides a safety feature for fastener-applying implements of the present type. It will also be observed that the present invention provides novel means for guiding the fasteners to the throat through which they are driven to adapt the implement to be used with staples having legs of different lengths.

While only one form of the invention is herein illustrated and described, it will be understood that modifications may be made in the structure and arrangement of the parts thereof without departing from the spirit or scope of the invention. Therefore, without limiting myself in this respect, I claim:

1. In a device of the type indicated, a base, a magazine-arm mounted for movement toward and away from the base, fastener-applying means mounted for movement on the magazine-arm to drive fasteners therefrom, said magazine-arm having a normal range of movement with respect to the base, and detent-means operative between the magazine-arm and fastener-applying means to prevent their relative movement toward each other when the magazine-arm is raised beyond its normal operative position with respect to the base.

2. In a device of the type indicated, a base, a magazine-arm mounted for movement toward and away from the base, fastener-applying means mounted for movement on the magazine-arm to drive fasteners therefrom, said magazine-arm having a normal range of movement with respect to the base, detent-means operative between the magazine-arm and fastener-applying means to prevent their relative movement toward each other when the magazine-arm is raised beyond its normal operative position with respect to the base, and means for releasing the detent-means upon movement of the magazine-arm to its normal operative position above the base.

3. In a device of the type indicated, a base, a magazine-arm mounted for movement toward and away from the base, said magazine-arm having a normal range of movement with respect to the base, a fastener-applying lever movable toward the magazine-arm to drive fasteners therefrom and away from the magazine-arm to open the latter to receive a supply of fasteners, detent-means operative between the magazine-arm and fastener-applying lever to prevent their movement toward each other when the magazine-arm is above its normal raised position with respect to the base, and means for releasing the detent-means upon movement of the magazine-arm to its normal position above the base.

4. In a device of the type indicated, a base, a magazine-arm mounted for movement toward and away from the base and having an open side extending longitudinally thereof, said magazine-arm having a normal range of movement with respect to the base, a lever movable relatively of the magazine-arm for closing the open side thereof, a driver operable by the lever, said lever being movable toward the magazine-arm to drive fasteners therefrom and away from the magazine-arm to open the latter to receive a supply of fasteners, detent-means operative between the lever and magazine-arm to prevent movement of the lever toward the magazine-arm when the arm is above its normal raised position with respect to the base, and means for releasing the detent-means upon movement of the magazine-arm to its normal operative position above the base.

5. In a device of the type indicated, a base, a magazine-arm mounted for movement toward and away from the base and having an open side extending longitudinally thereof, said magazine-arm having a normal range of movement with respect to the base, a lever movable relatively of the magazine-arm for closing the open side thereof, a driver adapted to be operated by the lever, a resilient element carried by the lever and engageable with the magazine-arm and base for holding the lever raised with respect to the magazine-arm and the magazine-arm raised with respect to the base, said resilient element operating between the lever and the magazine-arm to prevent movement of the lever toward the magazine-arm when the arm is raised above its normal operative position with respect to the base, and means on the base for releasing the resilient element upon movement of the magazine-arm to its normal operative position above the base.

6. In a device of the type indicated, a base, a magazine-arm mounted for movement toward and away from the base and having an open side extending longitudinally thereof, said magazine-arm having a normal range of movement with respect to the base, a lever movable relatively of the magazine-arm for closing the open side thereof, a resilient element on the lever having one end formed as a driver and its opposite free end engageable with the magazine-arm and base to hold the lever raised with respect to the magazine-arm and the arm raised with respect to the base, said lever being movable toward the magazine to drive fasteners therefrom and away from the magazine to open the latter to receive a supply of fasteners through its open side, the free end of said resilient element engaging the magazine-arm to prevent movement of the lever toward the magazine-arm to close the latter when it is above its normal raised position with respect to the base, and means on the base for releasing the free end of the resilient element upon movement of the magazine-arm to its normal operative position above the base.

7. In a device of the type indicated, a base, a magazine-arm mounted for movement toward and away from the base, said magazine-arm having a normal range of action with respect to the base, detent-means for restraining the magazine-arm from movement away from the base beyond its normal range of action, said detent-means being yieldable to permit the magazine-arm to be lifted away from the base beyond its normal range of action to adapt the implement for use as a stacker, a fastener-applying lever movable toward the magazine-arm to drive fasteners fed therefrom and movable away from the magazine-arm to open the latter to receive a supply of fasteners, and a second detent-means operative between the magazine-arm and fastener-applying lever to prevent their movement toward each other to close the magazine when the magazine-arm is raised above its normal range of action with respect to the base.

ARTHUR H. MAYNARD.